United States Patent
Lu et al.

(10) Patent No.: US 12,396,038 B2
(45) Date of Patent: Aug. 19, 2025

(54) CHANNEL LISTENING METHOD AND APPARATUS, TERMINAL, BASE STATION, AND STORAGE MEDIUM

(71) Applicant: GUANGDONG OPPO MOBILE TELECOMMUNICATIONS CORP., LTD., Dongguan (CN)

(72) Inventors: Qianxi Lu, Dongguan (CN); Xin You, Dongguan (CN); Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 342 days.

(21) Appl. No.: 17/565,328

(22) Filed: Dec. 29, 2021

(65) Prior Publication Data

US 2022/0183077 A1   Jun. 9, 2022

Related U.S. Application Data

(63) Continuation of application No. PCT/CN2019/101860, filed on Aug. 21, 2019.

(51) Int. Cl.
*H04W 74/0833* (2024.01)
*H04L 43/0864* (2022.01)
(Continued)

(52) U.S. Cl.
CPC ..... *H04W 74/0841* (2013.01); *H04L 43/0864* (2013.01); *H04W 74/006* (2013.01); *H04W 74/0833* (2013.01); *H04W 84/06* (2013.01)

(58) Field of Classification Search
CPC ......... H04W 74/0841; H04W 74/0833; H04W 74/006; H04W 84/06; H04L 43/0864
See application file for complete search history.

(56) References Cited

U.S. PATENT DOCUMENTS 10,813,137 B2 * 10/2020 Shih .................. H04W 74/0833
2013/0039309 A1 * 2/2013 Chiu ................. H04W 74/0833
                                                              370/328
(Continued)

FOREIGN PATENT DOCUMENTS

CN          1777062 A       5/2006
CN        101959210 A       1/2011
(Continued)

OTHER PUBLICATIONS

Examination Report—Communication pursuant to Article 94(3) EPC for European Application 19942515.8 mailed Dec. 9, 2022.
(Continued)

*Primary Examiner* — Redentor Pasia
(74) *Attorney, Agent, or Firm* — Sheppard, Mullin, Richter & Hampton LLP

(57) ABSTRACT

The present disclosure relates to a channel listening method, a channel listening apparatus, a computer device and a storage medium. A User Equipment (UE) receives network configuration information transmitted by a base station, the network configuration information includes at least a duration of a random access contention resolution timer. The UE determines initial offset time of the random access contention resolution timer, and start to listen to a Physical Downlink Control Channel (PDCCH) at a first time symbol after the initial offset time is reached, the duration of the random access contention resolution timer is a longest time for listening to the PDCCH. In this way, a problem of invalid listening caused by the fact that the UE prematurely starts the random access contention resolution timer due to an RTT that is too long can be avoided, thereby reducing a terminal loss.

18 Claims, 7 Drawing Sheets

(51) Int. Cl.
   *H04W 74/00*   (2009.01)
   *H04W 84/06*   (2009.01)

(56)   References Cited

U.S. PATENT DOCUMENTS

| | | | |
|---|---|---|---|
| 2013/0301541 | A1 | 11/2013 | Mukherjee et al. |
| 2019/0116613 | A1 | 4/2019 | Abedini et al. |
| 2020/0107377 | A1* | 4/2020 | Lee .................. H04W 72/23 |
| 2020/0170045 | A1* | 5/2020 | Lee .................. H04L 5/0055 |
| 2020/0236715 | A1* | 7/2020 | Akkarakaran .... H04W 74/0891 |
| 2020/0314908 | A1* | 10/2020 | Hwang ............ H04W 74/0833 |
| 2020/0413451 | A1* | 12/2020 | Taherzadeh Boroujeni ................ H04W 56/005 |
| 2021/0014905 | A1* | 1/2021 | Wu .................. H04W 52/0216 |
| 2021/0029658 | A1* | 1/2021 | Mahalingam ...... H04B 7/18513 |
| 2021/0321464 | A1* | 10/2021 | Lin .................. H04B 7/1851 |
| 2022/0006514 | A1* | 1/2022 | Sedin ................ H04B 7/18528 |
| 2022/0022262 | A1* | 1/2022 | Jia .................... H04W 4/70 |
| 2022/0046575 | A1* | 2/2022 | Kong ................ H04W 56/0045 |

FOREIGN PATENT DOCUMENTS

| | | |
|---|---|---|
| CN | 102067705 A | 5/2011 |
| CN | 102104465 A | 6/2011 |
| CN | 102257859 A | 11/2011 |
| CN | 102264148 A | 11/2011 |
| CN | 102545997 A | 7/2012 |
| CN | 102710399 A | 10/2012 |
| CN | 102821454 A | 12/2012 |
| CN | 103139920 A | 6/2013 |
| CN | 103391166 A | 11/2013 |
| CN | 103458494 A | 12/2013 |
| CN | 103702408 A | 4/2014 |
| CN | 103945471 A | 7/2014 |
| CN | 105101104 A | 11/2015 |
| CN | 105657814 A | 6/2016 |
| CN | 106162919 A | 11/2016 |
| CN | 106488550 A | 3/2017 |
| CN | 107438265 A | 12/2017 |
| CN | 108738159 A | 11/2018 |
| CN | 109219116 A | 1/2019 |
| CN | 109413734 A | 3/2019 |
| CN | 109644440 A | 4/2019 |
| CN | 110098892 A | 8/2019 |
| WO | 2018058407 A1 | 4/2018 |

OTHER PUBLICATIONS

Zte et al: "Report of Email Discussion [106#70] [NR/NTN] RACH capacity/procedures",3GPP Draft; R2-1909256 Report of [106#70][NRNTN]RACH CapacityProcedures-V1, 3rd Generation Partnership Project (3GPP), Mobile Competence Centre ; 650, Route Deslucioles ; F-06921 Sophia-Antipolis .Is Ced vol. RAN WG2, No. Prague, Czech; Aug. 26, 2019-Aug. 30, 2019 Aug. 15, 2019 (Aug. 15, 2019),XP051767060.

Extended European Search Report dated May 24, 2022 received in European Patent Application No. EP 19942515.8.

Thales: "105#52 (NR-NTN) TP on RAN2 agreements", 3GPP Draft; R2-1905297_105#52 NR-NTN TP on RAN2 Agreements_V8 , 3rd Generation Partnership Project (3GPP) , Mobile Competence Centre ; 650 , Route Des Lucioles ; F-06921 Sophia-Antipolis Cedex ; France vol. RAN WG2 , No. Xi' An, China; Apr. 12, 2019-Apr. 8, 2019 , Apr. 12, 2019 (Apr. 12, 2019) , XP051709726.

Sharp: "Harq for Msg3 transmission" , 3GPP Draft; R2-085073_MSG3_HARQ, 3rd Generation Partnership Project (3GPP) ,Mobile Competence Centre ; 650 , Route Des Lucioles ; F-06921 Sophia-Antipolis Cedex ; France ,No. Prague, Czech Republic; Sep. 22, 2008 ,Sep. 22, 2008 (Sep. 22, 2008) ,XP050320017.

Communication pursuant to Article 94(3) EPC for European application 19942515.8 mailed Jun. 12, 2023.

International Search Report and Written Opinion dated May 9, 2020 in International Application No. PCT/CN2019/101860. English translation attached.

Thales. "105#52 (NR-NTN) TP on RAN2 agreements" 3GPP TSG-RAN WG2 Meeting # 105bis, R2-1905297, Apr. 12, 2019 (Apr. 12, 2019), Section 7.2.1.1.

The First Office Action from corresponding Chinese Application No. 201980094040.8, dated Jan. 4, 2024. English translation attached.

The Grant Notice from corresponding Chinese Application No. 201980094040.8, dated May 11, 2024, 7 pages.

* cited by examiner

Transmitting by a base station, network configuration information to a UE, the network configuration information including at least a duration of a random access contention resolution timer ; and determining, by the UE , initial offset time of the random access contention resolution timer, and starting to listen to a Physical Downlink Control CHannel (PDCCH) at a first time symbol after the initial offset time is reached , the duration of the random access contention resolution timer being a longest time for listening to the PDCCH  S301

FIG. 3

CHANNEL LISTENING METHOD AND APPARATUS, TERMINAL, BASE STATION, AND STORAGE MEDIUM

CROSS REFERENCE OF RELATED APPLICATION

The present disclosure is a continuation of the International Application No. PCT/CN2019/101860 filed on Aug. 21, 2019, which is hereby incorporated by reference in its entirety.

TECHNICAL FIELD

The present disclosure relates to the field of communications, and more particularly, to a channel listening method, a channel listening apparatus, a terminal, a base station, and a storage medium.

BACKGROUND

Random access technology is a primary step of establishing a connection between a User Equipment (UE) and a network for communication in a mobile communication system. Currently, in a New Radio (NR) technology, a contention-based random access scheme and a non-contention-based random access scheme are mainly supported.

The contention-based random access scheme in the NR technology mainly includes the followings. A UE transmits a preamble (Message 1, Msg1) to a network on a selected Physical Random Access Channel (PRACH). After transmitting the Msg1, the UE starts a random access response time window, and listens to a Physical Downlink Control Channel (PDCCH) scrambled with a Random Access Radio Network Temporary Identifier (RA-RNTI) within the random access response time window. After successfully listening to a Random Access Response (RAR) carried on the PDCCH scrambled with the RA-RNTI, i.e., after receiving Message 2 (Msg2), the UE transmits Message 3 (Msg3) to the network on an uplink resource scheduled by the RAR. After each Msg3 transmission, the UE starts/restarts a contention resolution timer (ra-ContentionResolutionTimer), and listens to the PDCCH within the running time of the contention resolution timer in order for receiving a contention resolution message (Message 4, Msg4).

Currently, the 3rd Generation Partnership Project (3GPP) is researching Non Terrestrial Network (NTN) technology, and the NTN generally provides communication services to terrestrial users by means of satellite communication. The random access procedure needs to be performed in the NTN technology as well. The random access mechanism of the current NR technology can be attempted to apply in the NTN technology.

SUMMARY

Based on the above, it is necessary to provide a channel listening method, a channel listening apparatus, a terminal, a base station, and a storage medium.

In a first aspect, an embodiment of the present disclosure provides a channel listening method. The method includes:
receiving, by a User Equipment (UE), network configuration information transmitted by a base station, the network configuration information including at least a duration of a random access contention resolution timer; and
determining, by the UE, initial offset time of the random access contention resolution timer, and starting to listen to a Physical Downlink Control Channel (PDCCH) at a first time symbol after the initial offset time is reached, the duration of the random access contention resolution timer being a longest time for listening to the PDCCH.

In a second aspect, an embodiment of the present disclosure provides a channel listening method. The method includes:
transmitting, by a base station, network configuration information to a User Equipment (UE), the network configuration information including at least a duration of a random access contention resolution timer; and
determining, by the UE, initial offset time of the random access contention resolution timer, and starting to listen to a Physical Downlink Control Channel (PDCCH) at a first time symbol after the initial offset time is reached, the duration of the random access contention resolution timer being a longest time for listening to the PDCCH.

In an embodiment of the first aspect or the second aspect, the network configuration information further includes an initial time offset of the random access contention resolution timer, and the initial offset time is determined by the UE based on the initial time offset of the random access contention resolution timer.

In an embodiment of the first aspect or the second aspect, the duration of the random access contention resolution timer is determined by the base station based on a transmission delay, the transmission delay being determined by the base station based on a difference between a signal Round Trip Time (RTT) between a first position and the base station and a signal RTT between a second position and the base station, time for processing Message 3 (Msg3) in random access, and time for scheduling Message 4 (Msg4) in the random access; the first position is a ground position closest to the base station within a ground range covered by the base station, and the second position is a ground position farthest from the base station within the ground range covered by the base station.

In an embodiment of the first aspect or the second aspect, the duration of the random access contention resolution timer being determined by the base station based on the transmission delay includes:
when a value of a candidate duration among all candidate durations of the random access contention resolution timer is greater than the transmission delay, the duration of the random access contention resolution timer being a candidate duration which is greater than the transmission delay and has a minimum difference from the transmission delay; and
when none of all candidate durations of the random access contention resolution timer has a value greater than the transmission delay, the duration of the random access contention resolution timer being a maximum candidate duration.

In an embodiment of the first aspect or the second aspect, the initial offset time is determined by the UE based on a signal Round Trip Time (RTT) between a position of the UE and the base station.

In an embodiment of the first aspect or the second aspect, the duration of the random access contention resolution timer is determined by the base station based on time for processing Message 3 (Msg3) in random access and time for scheduling Message 4 (Msg4) in the random access.

In an embodiment of the first aspect or the second aspect, the network configuration information includes a first duration and a second duration of the random access contention resolution timer, the first duration being greater than the second duration, and the network configuration information further includes an initial time offset of the random access contention resolution timer.

In an embodiment of the first aspect or the second aspect, the first duration is determined by the base station based on a transmission delay, the transmission delay being determined by the base station based on a difference between a signal Round Trip Time (RTT) between a first position and the base station and a signal RTT between a second position and the base station, time for processing Message 3 (Msg3) in random access, and time for scheduling Message 4 (Msg4) in the random access; the first position is a ground position closest to the base station within a ground range covered by the base station, and the second position is a ground position farthest from the base station within the ground range covered by the base station.

In an embodiment of the first aspect or the second aspect, the first duration being determined by the base station based on the transmission delay includes:
when a value of a candidate duration among all candidate durations of the random access contention resolution timer is greater than the transmission delay, the first duration being a candidate duration which is greater than the transmission delay and has a minimum difference from the transmission delay; and
when none of all candidate durations of the random access contention resolution timer has a value greater than the transmission delay, the first duration being a maximum candidate duration.

In an embodiment of the first aspect or the second aspect, the second duration is determined by the base station based on time for processing Message 3 (Msg3) in random access and time for scheduling Message 4 (Msg4) in the random access.

In an embodiment of the first aspect or the second aspect, the initial time offset of the random access contention resolution timer is determined by the base station based on a signal Round Trip Time (RTT) between a first position and the base station, and the first position is a ground position closest to the base station within a ground range covered by the base station.

In an embodiment of the first aspect or the second aspect, the initial time offset of the random access contention resolution timer being determined by the base station based on the signal RTT between the first position and the base station includes:
when a candidate initial time offset among all candidate initial time offsets is smaller than the RTT, the initial time offset of the random access contention resolution timer being a candidate initial time offset which is smaller than the RTT and has a minimum difference from the RTT; and
when all the candidate initial time offsets are greater than the RTT, the initial time offset of the random access contention resolution timer being a minimum candidate initial time offset.

In an embodiment of the first aspect or the second aspect, the UE is a terminal with positioning capability, and the initial offset time of the random access contention resolution timer is determined by the UE based on a signal RTT between a position of the UE and the base station; and the second duration is the longest time for listening to the PDCCH.

In an embodiment of the first aspect or the second aspect, the UE is a terminal without positioning capability, and the initial offset time of the random access contention resolution timer is determined by the UE based on the initial time offset of the random access resolution timer carried in the network configuration information; and the first duration is the longest time for listening to the PDCCH.

In an embodiment of the first aspect or the second aspect, the network configuration information is carried in a system message.

In a third aspect, an embodiment of the present disclosure provides a channel listening apparatus, including:
a receiving module configured to receive network configuration information transmitted by a base station, the network configuration information including at least a duration of a random access contention resolution timer; and
a listening module configured to determine initial offset time of the random access contention resolution timer, and start to listen to a Physical Downlink Control Channel (PDCCH) at a first time symbol after the initial offset time is reached, the duration of the random access contention resolution timer being a longest time for listening to the PDCCH.

In a fourth aspect, an embodiment of the present disclosure provides a channel listening apparatus including a processing module and a transmitting module. The processing module is configured to transmit network configuration information to a User Equipment (UE) through the transmitting module. The network configuration information includes at least a duration of a random access contention resolution timer. The UE is configured to determine initial offset time of the random access contention resolution timer, and start to listen to a Physical Downlink Control Channel (PDCCH) at a first time symbol after the initial offset time is reached. The duration of the random access contention resolution timer is a longest time for listening to the PDCCH.

In a fifth aspect, an embodiment of the present disclosure provides a terminal, including a processor and a memory storing a computer program. The computer program, when executed by the processor, implements steps of the method according to any embodiment of the first aspect.

In a sixth aspect, an embodiment of the present disclosure provides a base station, including a processor and a memory storing a computer program. The computer program, when executed by the processor, implements steps of the method according to any embodiment of the second aspect.

In a seventh aspect, an embodiment of the present disclosure provides a computer-readable storage medium, having a computer program stored therein. The computer program, when executed by a processor, implements steps of method according to any embodiment of the first aspect.

In an eighth aspect, an embodiment of the present disclosure provides a computer-readable storage medium, having a computer program stored therein, wherein the computer program, when executed by a processor, implements steps of method according to any embodiment of the second aspect.

According to the channel listening method, the channel listening apparatus, the terminal, the base station and the storage medium provided by the present disclosure, the UE receives the network configuration information transmitted by the base station, determines initial offset time of the random access contention resolution timer, and starts to listen to a Physical Downlink Control Channel (PDCCH) at the first time symbol after the initial offset time is reached, and the duration of the random access contention resolution timer is the longest time for listening to the PDCCH. Since the network configuration information includes at least a duration of the random access contention resolution timer as configured by the base station for the UE in the NTN, the UE farther away from the base station can still receive random access contention resolution during a running period of the ra-ContentionResolutionTimer, and the UE can also determine the initial offset time of the random access contention resolution timer based on its own condition, thereby avoiding a problem of invalid listening caused by the fact that the UE prematurely starts the ra-ContentionResolutionTimer due to an RTT that is too long, and reducing the terminal loss.

BRIEF DESCRIPTION OF DRAWINGS

FIG. 3 is a flowchart illustrating another channel listening method according to an embodiment of the present disclosure;

DESCRIPTION OF EMBODIMENTS

In order to make the objects, technical solutions, and advantages of the present disclosure more apparent, the embodiments of the present disclosure will be described in further detail below in conjunction with the accompanying drawings. It should be understood that the specific embodiments described here are only used to explain, rather than limiting, the present disclosure.

Currently, an NTN technology is researched by 3GPP. The NTN technology generally provides communication services to terrestrial users by means of satellite communication, and the satellite communication has many unique advantages compared with terrestrial cellular network communication. First, the satellite communication is not limited by user regions. For example, the general terrestrial communication cannot cover regions where a communication equipment cannot be set up, such as oceans, mountains, deserts, and the like, or regions where communication coverage is not performed due to underpopulation. However, for the satellite communication, since one satellite can cover a broader ground and the satellite can orbit around the earth, theoretically every corner on the earth can be covered by the satellite communication. Second, the satellite communication has a great social value. The satellite communication can cover remote mountain areas, poor and laggard countries or areas at a lower cost, so that people in these areas can enjoy advanced voice communication and mobile internet technology, the digital gap between these areas and developed areas is favorably reduced, and the development of these areas is promoted. Thirdly, the distance of the satellite communication is long, and the communication cost is not obviously increased when the communication distance is increased. And finally, the satellite communication has high stability and is not limited by natural disasters.

Generally, communication satellites are classified into Low-Earth Orbit (LEO) satellites, Medium-Earth Orbit (MEO) satellites, Geostationary Orbit (GEO) satellites, High Elliptic Orbit (HEO) satellites, and the like according to the difference in orbit heights.

Figures 1, 2:
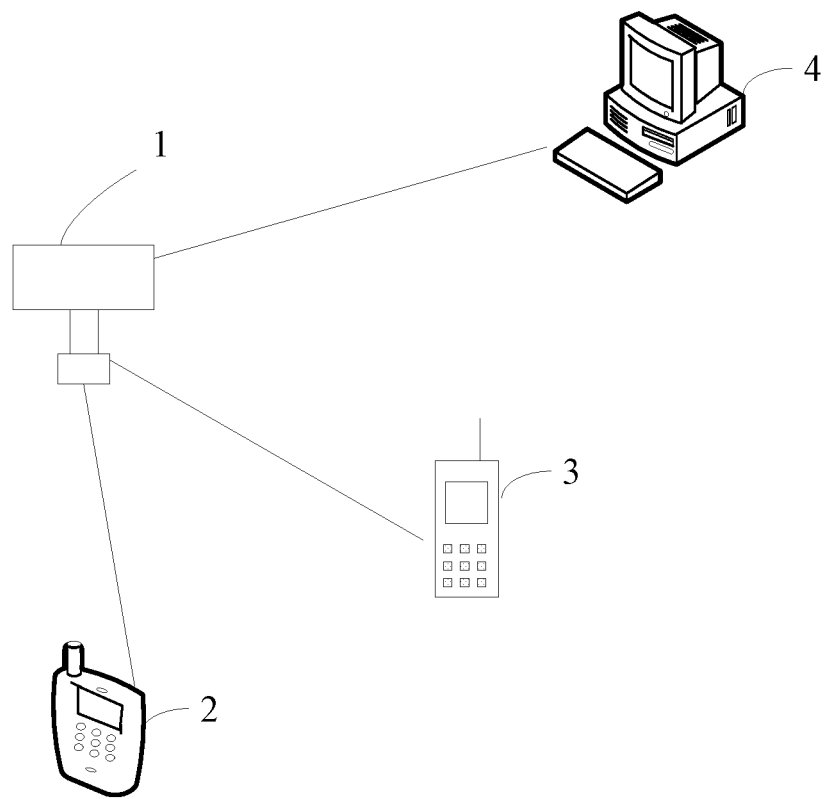
FIG. 1 is a schematic diagram showing an application scenario of a channel listening method according to an embodiment of the present disclosure.
FIG. 2 is a flowchart illustrating a channel listening method according to an embodiment of the present disclosure.

A channel listening method according to an embodiment of the present disclosure can be applied to the NTN technology. FIG. 1 is a schematic diagram showing an application scenario of the channel listening method according to an embodiment of the present disclosure. As shown in FIG. 1, the scenario includes a base station 1, a UE 2, a UE 3, and a UE 4, where the base station 1 communicates with the UE 2, the UE 3, and the UE 4 via a network. The base station 1 may be, but not limited to, an LEO satellite, an MEO satellite, a GEO satellite, an HEO satellite, and the like. The UEs may be, but not limited to, various personal computers, notebook computers, smart phones, tablets, portable wearable devices, and the like. It should be noted that, the present disclosure may include a greater number of base stations and UEs, and is not limited to FIG. 1.

Taking FIG. 1 as a scenario, for a contention-based random access procedure in the NR technology, after a UE transmits Msg3 to the base station each time, the UE starts or restarts a timer (ra-ContentionResolutionTimer) and listens to a PDCCH during the running time of the timer to receive Msg4 transmitted by the base station. If the UE receives no PDCCH scrambled with a Cell Radio Network Temporary Identifier (C-RNTI) or a Temporary Cell Radio Network Temporary Identifier (TC-RNTI) until the ra-ContentionResolutionTimer expires, it is considered that the current random access fails, and the UE will retransmit the Msg1. When the number of transmissions of the Msg1 by the UE reaches a certain threshold, the UE indicates to a higher layer that a problem of random access occurs. The ra-ContentionResolutionTimer starts at a next time symbol after each Msg3 transmission by the UE. The duration of the timer may be configured by the network.

In comparison with a cellular network adopted by the traditional NR, a signal transmission delay between a UE and a satellite in the NTN is greatly increased. In addition, since a coverage area of the satellite is very large, different UEs in the same satellite coverage area are located at different positions and therefore there may be a great difference in the signal transmission delays between the UEs and the satellite. Thus, if the random access mechanism of the current terrestrial NR system is directly adopted in the NTN system, there may be two problems as follows.

1. Since transmitting the Msg3, the UE needs to wait at least for one Round Trip Time (RTT) to receive Msg4, i.e., the Msg3 transmission time plus the Msg4 transmission time. Since the coverage area of the base station in the cellular network is small and the signal transmission time between the UE and the base station is relatively short, in the NR system, the UE starts the ra-ContentionResolutionTimer immediately after transmitting the Msg3. However, the signal transmission time between the UE and the satellite in the NTN is relatively long, and the RTT may be 541.46 ms at the longest. If the UE in the NTN still starts the ra- ContentionResolutionTimer at a next time symbol after transmitting the Msg3, there is probably a problem that the UE starts the ra-ContentionResolutionTimer prematurely due to a long RTT, causing the UE listening to the PDCCH inefficiently, which will undoubtedly increase a terminal power consumption.

2. In a traditional cellular network, there is a small difference in RTTs between different UEs in the coverage area of a same base station and the base station. If different UEs transmit their respective Msg3 at the same time, these Msg3 transmitted by the different UEs arrive at the base station at almost the same time. Therefore, currently, the time required by the base station to process Msg3 and schedule Msg4 is mainly considered in the configuration of the ra-ContentionResolutionTimer. In the NTN, the coverage area of a satellite is large, and different UEs in the coverage area of a same satellite are located at different positions, so that there may be a large difference in the signal transmission time in the communications between the UEs and the satellite. Therefore, when the ra-ContentionResolutionTimer is configured to have a duration which is not long enough, because the RTT is too long, the UE farther away from the satellite may not be able to receive the random access contention resolution during the operation of the ra-ContentionResolutionTimer. When the ra-ContentionResolutionTimer is configured to have a duration that is too long, the time for the UE to listen to the PDCCH may be increased, thereby increasing the terminal power consumption.

In view of the above problems, for the ra-ContentionResolutionTimer in the NTN system, on one hand, a delay offset for starting the ra-ContentionResolutionTimer by the UE needs to be introduced, and on the other hand, a longer duration may need to be configured for the ra-ContentionResolutionTimer.

Therefore, the channel listening method according to the embodiment of the present disclosure can solve the problem of large terminal power consumption caused by the above two situations. That is, the following problems need to be solved:

(1) how to determine the delay offset from UE transmitting the Msg3 to starting the ra-ContentionResolutionTimer; and (2) how to determine the duration of the ra-ContentionResolutionTimer.

It should be noted that, the channel listening method according to the present disclosure is not limited to solve the above technical problems, and may also be used to solve other technical problems which are not limited in the present disclosure.

FIG. 2 is a flowchart illustrating a channel listening method according to an embodiment of the present disclosure. The method relates to a specific implementation process in which, after a UE receives network configuration information transmitted by a base station, the UE starts to, at a time symbol after the initial offset time is reached, listen to a Physical Downlink Control Channel (PDCCH) within a duration of a random access contention resolution timer configured by a network. As shown in FIG. 2, the method includes the following steps.

At S201, a UE receives network configuration information transmitted by a base station, the network configuration information including at least a duration of a random access contention resolution timer.

The duration of the random access contention resolution timer may be a duration determined by the base station based on a plurality of factors. For example, the factors may include a difference between a signal RTT between a position closest to the base station and the base station and a signal RTT between a position farthest from the base station and the base station within a ground range covered by the base station, time for the network to process Msg3, time required to schedule Msg4, and the like, and may be determined in different manners based on different scenarios.

In the embodiment, the base station configures, for the UE within its coverage area, network configuration information for random access. The network configuration information may include at least a duration of a random access contention resolution timer. Optionally, the network configuration information may further include an initial time offset, and the base station may configure different network configuration information based on different scenarios. For example, for a scenario in which all the UEs within a service range of the base station do not have positioning capabilities, the base station may configure the duration of the random access contention resolution timer and the initial time offset in the network configuration information, and the behaviors of the UE in starting and maintaining the random access contention resolution timer both follow the network configuration information. Alternatively, for a scenario in which the UEs within the service range of the base station all have positioning capabilities, the base station may configure the duration of the random access contention resolution timer in the network configuration information, and the UE may determine the starting time of the random access contention resolution timer based on an estimation of the signal RTT between the position of the UE and the base station by use of its own positioning capability. Other scenarios are also possible, but are not limited in the embodiment. In addition, the base station may transmit the network configuration information in a broadcast manner, or the base station may transmit the network configuration information to the UE in a directional manner.

Optionally, the network configuration information is configured to be public for a cell, and the network configuration information may be carried in a system message, for example, a System Information Block (SIBx)(x is greater than or equal to 1).

At S202, the UE determines initial offset time of the random access contention resolution timer, and starts to listen to a Physical Downlink Control Channel (PDCCH) at a first time symbol after the initial offset time is reached, the duration of the random access contention resolution timer being a longest time for listening to the PDCCH.

In the embodiment, the UE may determine the initial offset time of the random access contention resolution timer in different manners based on different scenarios and content in the network configuration information, and start to listen to the PDCCH at the first time symbol after the initial offset time is reached. The duration of the random access contention resolution timer is the longest time for listening to the PDCCH. For example, based on the network configuration information, in the random access process, after the UE transmits Msg3 each time, the UE starts to listen to the PDCCH scrambled with a C-RNTI or a TC-RNTI at a first time symbol after the initial offset time of the random access contention resolution timer is reached, and receives a corresponding contention resolution message.

The UE may determine the initial offset time of the random access contention resolution timer in different manners. For example, if the network configuration information further includes an initial time offset of the random access contention resolution timer, the UE may determine the initial offset time based on the time when the Msg3 is transmitted and the initial time offset of the random access contention resolution timer. Alternatively, the network configuration information does not carry the initial time offset of the random access contention resolution timer, and the UE may determine the initial offset time based on the signal RTT between the satellite and a position closest to the base station within the ground range covered by the base station.

In the channel listening method according to the embodiment, the UE receives the network configuration information transmitted by the base station, determines the initial offset time of the random access contention resolution timer, and starts listening to the PDCCH at the first time symbol after the initial offset time is reached. Here, the duration of the random access contention resolution timer is the longest time for listening to the PDCCH. Since the network configuration information includes at least the duration of the random access contention resolution timer as configured by the base station for the UE in the NTN, the UE farther from the base station can still receive a random access contention resolution during a running period of the ra-ContentionResolutionTimer, and the UE can determine the initial offset time of the random access contention resolution timer based on its own condition, thereby avoiding a problem of invalid listening caused by the fact that the UE prematurely starts the ra-ContentionResolutionTimer due to an RTT that is too long, and reducing a loss of the terminal.

FIG. 3 is a flowchart illustrating another channel listening method according to an embodiment of the present disclosure. The method relates to a specific implementation process in which, a base station transmits network configuration information to a UE, so that the UE starts to, at a time symbol after the initial offset time is reached, listen to a PDCCH within a duration of a random access contention resolution timer configured by a network. As shown in FIG. 3, the method includes the following steps.

At S301, a base station transmits network configuration information to a UE, the network configuration information including at least a duration of a random access contention resolution timer; and the UE determines initial offset time of the random access contention resolution timer, and starts to listen to a Physical Downlink Control Channel (PDCCH) at a first time symbol after the initial offset time is reached, the duration of the random access contention resolution timer being a longest time for listening to the PDCCH.

For the implementation principle and the beneficial effect of the channel listening method according to the embodiment, reference may be made to the embodiment in FIG. 2, and details thereof will be omitted here.

On the basis of the embodiments shown in FIG. 2 or FIG. 3, different network configuration modes may be available in different scenarios, and specific implementation manners of the above channel listening methods are respectively described below for multiple scenarios. It should be noted that, in the following scenarios, a satellite is taken as the base station for illustration, but the present disclosure is not limited thereto.

Scenario 1

In a scenario in which all UEs within a coverage area of a satellite do not have the positioning capability, the satellite configures the initial offset time and the duration of the random access contention resolution timer in a broadcasting mode, and the behaviors of all the UEs in starting and maintaining the random access contention resolution timer follow the configuration of the network.

In one embodiment, the network configuration information further includes an initial time offset of the random access contention resolution timer, and the initial offset time is determined by the UE based on the initial time offset of the random access contention resolution timer. In the embodiment, the base station may configure an initial time offset of the random access contention resolution timer in the network configuration information, and the UE may obtain the initial offset time according to the time when the Msg3 is transmitted plus the initial time offset.

Further, the initial time offset of the random access contention resolution timer is determined by the base station based on a signal RTT between a first position and the base station. The first position is a ground position closest to the base station within a ground range covered by the base station. Optionally, the initial time offset of the random access contention resolution timer being determined by the base station based on the signal RTT between the first position and the base station includes:

when a value of a candidate initial time offset among all candidate initial time offsets is smaller than the RTT, the initial time offset of the random access contention resolution timer being a candidate initial time offset which is smaller than the RTT and has a minimum difference from the RTT; and when all candidate initial time offsets each have a value greater than that of the RTT, the initial time offset of the random access contention resolution timer being the minimum candidate initial time offset.

In the present embodiment, the satellite can determine the initial time offset (TimeOffset) of the random access contention resolution timer (ra-ContentionResolutionTimer) based on the signal RTT between the position closest to the satellite within the ground range covered by the satellite and the satellite. That is, first, $RTT\_min=2*dmin/v$ is calculated, where dmin represents a distance between the position closest to the satellite within the ground range covered by the satellite and the satellite, and v represents a signal transmission speed.

(1) When a value of a candidate initial time offset among all the candidate initial time offsets (TimeOffset) is smaller than RTT_min, the TimeOffset is configured as a value of the candidate initial time offset which is smaller than RTT_min and closest to RTT_min among all the candidate initial time offsets (TimeOffset).

(2) When all the candidate initial time offsets (TimeOffset) each have a value greater than RTT_min, the TimeOffset is configured as a smallest value among the values of all the candidate initial time offsets (TimeOffset).

It should be noted that, the configuration of the TimeOffset depends on the network implementation, and the above is only one implementation method of the network, and the network may determine the configuration of the TimeOffset based on other methods.

In one embodiment, the duration of the random access contention resolution timer is determined by the base station based on a transmission delay, and the transmission delay is determined by the base station based on a difference between a signal Round Trip Time (RTT) between a first position and the base station and a signal RTT between a second position and the base station, time for processing Message 3 (Msg3) in random access, and time for scheduling Message 4 (Msg4) in the random access. Here, the first position is a ground position closest to the base station within a ground range covered by the base station, and the second position is a ground position farthest from the base station within the ground range covered by the base station.

In the embodiment, the network can determine the configuration of the duration of the random access contention resolution timer (the ra-ContentionResolutionTimer) based on the difference between the signal RTT between the position closest to the satellite in the ground range covered by the satellite and the satellite and the signal RTT between the position farthest from the satellite in the ground range covered by the satellite and the satellite, and the time required by the network to process the Msg3 and schedule the Msg4 take into account, so as to guarantee that both the UE farthest from the satellite and the UE closet to the satellite can detect the Msg4 transmitted on the PDCCH. The transmission delay RTT_delta is first calculated based on a formula of RTT_delta=2*(dmax-dmin)/v+process_time, where dmax represents a distance between a ground position farthest from the satellite within the coverage area of the satellite and the satellite, dmin represents a distance between a ground position closest to the satellite within the coverage area of the satellite and the satellite, v represents a signal transmission speed, and process_time represents time reserved by the network for processing the Msg3 and scheduling the Msg4.

Further, the duration of the random access contention resolution timer being determined by the base station based on the transmission delay includes:

when a value of a candidate duration among all candidate durations of the random access contention resolution timer is greater than the transmission delay, the duration of the random access contention resolution timer being a candidate duration which is greater than the transmission delay and has a minimum difference from the transmission delay; and when none of all candidate durations of the random access contention resolution timer has a value greater than the transmission delay, the duration of the random access contention resolution timer being a maximum candidate duration.

In the embodiment, the duration of the random access contention resolution timer may be determined for the following two cases.

(1) When a value of a duration among all the supported durations of the ra-ContentionResolutionTimer is greater than RTT_delta, the duration of the ra-ContentionResolutionTimer is configured as a value of the duration among all the supported durations of the ra-ContentionResolutionTimer which is greater than RTT_delta and closest to RTT_delta.

(2) When all the values of supported durations of the ra-ContentionResolutionTimer are smaller than the value of RTT_delta, the duration of the ra-ContentionResolutionTimer is configured as a largest value among the values of all the supported durations of the ra-ContentionResolutionTimer.

It should be noted that, the configuration of the ra-ContentionResolutionTimer depends on the network implementation, and the above is only one implementation method of the network, and the network may determine the configuration of the ra-ContentionResolutionTimer according to other methods.

Figure 4:
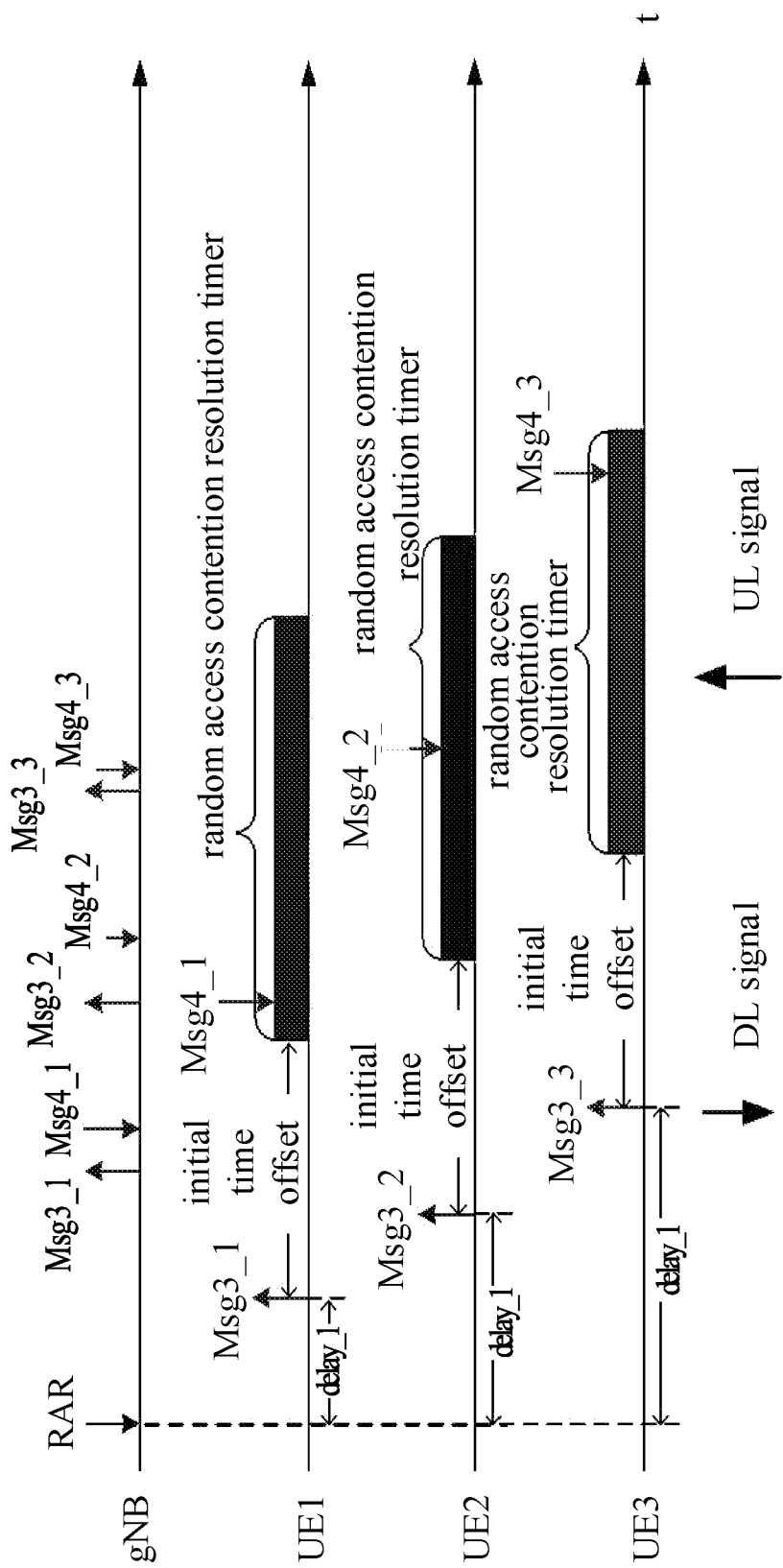
FIG. 4 is a schematic timing diagram showing a channel listening method according to an embodiment.

FIG. 4 is a schematic timing diagram showing a channel listening method according to an embodiment. As shown in FIG. 4, a UE receives network configuration information broadcasted by a satellite, and obtains a configuration of a random access contention resolution timer (ra-ContentionResolutionTimer), including an initial time offset (TimeOffset) and a timer duration of the ra-ContentionResolutionTimer. According to the network configuration information, for three UEs (UE 1, UE 2 and UE 3) in a cell, in a random process, each UE starts the ra-ContentionResolutionTimer at a first time symbol after a period of TimeOffset elapsed since the UE transmitted Msg3, and listens to and receives a PDCCH scrambled with C-RNTI or TC-RNTI during the operation of the ra-ContentionResolutionTimer, until the PDCCH is successfully received or the ra-ContentionResolutionTimer expires. The durations of the TimeOffset and the ra-ContentionResolutionTimer both adopt values configured by the network.

In the channel listening method according to the embodiment, for a scenario in which all UEs in the coverage area of the satellite do not have positioning capability, the satellite uniformly configures the initiate time offset and duration of the random access contention resolution timer, and the behaviors of all the UEs in starting and maintaining the random access contention resolution timer follow the configuration of the network, so that all the UEs can start the random access contention resolution timer at accurate time and listen to the PDCCH within a sufficient duration of the random access contention resolution timer, thereby ensuring listening quality and reducing terminal power consumption.

Scenario 2

For a scenario in which all UEs in a coverage area of a satellite have positioning capabilities, the satellite configures a duration of a random access contention resolution timer in a broadcasting mode, each of the UEs determines starting time of the random access contention resolution timer based on an estimated signal RTT between the UE and the satellite, and a longest time for listening to a PDCCH indicating contention resolution (namely the duration of the random access contention resolution timer) follows the configuration of a network.

In one embodiment, the initial offset time is determined by the UE based on the signal RTT between a position of the UE and the base station. Based on the positioning capability, the UE estimates a distance d between the UE and the satellite based on the position of the UE, and further determines the signal RTT=2*d/v in the communication between the UE and the satellite, where v represents a signal transmission rate, then the initiate time offset TimeOffset of the ra-ContentionResolutionTimer of the UE is equal to RTT.

Further, the duration of the random access contention resolution timer is determined by the base station based on time for processing a first message (Message 3 (Msg3) in random access) and time for scheduling a second message (Message 4 (Msg4) in the random access). For the configuration of duration of the ra-ContentionResolutionTimer, the network may determine the configuration of duration based on the time required to process the Msg3 and schedule the Msg4.

Figure 5:
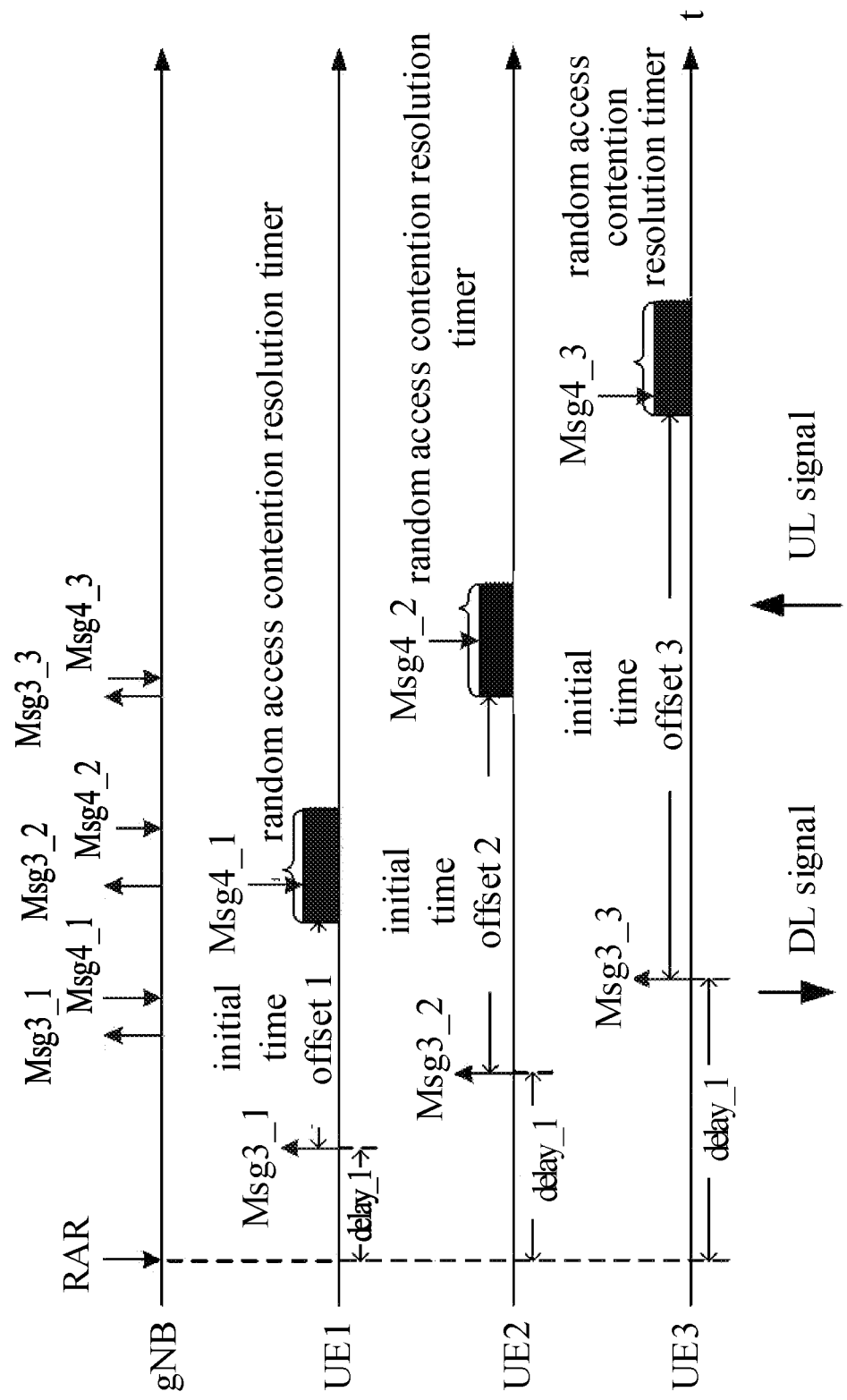
FIG. 5 is a schematic timing diagram showing a channel listening method according to another embodiment.

FIG. 5 is a schematic timing diagram showing a channel listening method according to another embodiment. As shown in FIG. 5, a UE receives network configuration information broadcasted by a satellite, and obtains configuration of a random access contention resolution timer, mainly a duration of a timer ra-ContentionResolutionTimer. For three UEs (UE 1, UE 2, and UE 3) in a cell, each UE estimates a signal RTT in the communication between the UE and the satellite based on the positioning capability, which is RTT_1, RTT_2, and RTT_3 respectively, and further determines initial offset time of the ra-ContentionResolutionTimer for the UE. The UE 1, UE 2, and UE 3 determine the initial time offset of their respective ra-ContentionResolutionTimer to be TimeOffset_1=RTT_1, TimeOffset_2=RTT_2, TimeOffset_3=RTT_3 respectively.

In the random procedure of the UEs, for the UE 1, the UE 1 starts a ra-ContentionResolutionTimer at a first time symbol after a period of TimeOffset_1 elapsed since the UE1 transmitted Msg3, and a duration of the timer has a value configured by the network; for the UE 2, the UE 2 starts a ra-ContentionResolutionTimer at a first time symbol after a period of TimeOffset_2 elapsed since the UE2 transmitted Msg3, and a duration of the timer has a value configured by the network; for the UE 3, the UE 3 starts a ra-Contention-ResolutionTimer at a first time symbol after a period of TimeOffset_3 elapsed since the UE3 transmitted Msg3, and a duration of the timer has a value configured by the network. Each UE listens to and receives a PDCCH scrambled with C-RNTI or TC-RNTI during the operation of the ra-ContentionResolutionTimer until the PDCCH is successfully received or the ra-ContentionResolutionTimer expires.

In the channel listening method according to the embodiment, for a scenario in which all UEs within the coverage area of the satellite have positioning capabilities, the satellite configures the duration of the random access contention resolution timer in a broadcast manner, and each of the UEs determines the starting time of the random access contention resolution timer based on an estimated signal RTT between the UE and the satellite. In this way, the positioning capabilities of the UEs are fully utilized, such that the UEs can determine the starting time of the random access contention resolution timers based on signal RTTs between the respective UEs and the satellite, and therefore each of the UEs can obtain a more accurate starting time.

Scenario 3

For a scenario in which a UE with positioning capability and a UE without positioning capability coexist in a coverage area of a satellite, the satellite configures one initial time offset of a random access contention resolution timer and two durations of random access contention resolution timers in a broadcasting mode. For the UE with positioning capability and the UE without positioning capability, different methods are adopted to determine a starting time of the random access contention resolution timer and a longest time for listening to a PDCCH (namely the duration of the random access contention resolution timer).

In one embodiment, the network configuration information includes a first duration and a second duration of the random access contention resolution timer, the first duration is greater than the second duration, and the network configuration information further includes an initial time offset of the random access contention resolution timer.

In the embodiment, the UE receives the network configuration information, configures relevant parameters of ra-ContentionResolutionTimer, including one initial time offset of ra-ContentionResolutionTimer and 2 durations of ra-ContentionResolutionTimers which are a first duration ra-ContentionResolutionTimer_long and a second ra-ContentionResolutionTimer_short, respectively.

Further, the first duration is determined by the base station based on a transmission delay, the transmission delay is determined by the base station based on a difference between a signal Round Trip Time (RTT) between a first position and the base station and a signal RTT between a second position and the base station, time for processing Message 3 (Msg3) in random access, and time for scheduling Message 4 (Msg4) in the random access. The first position is a ground position closest to the base station within a ground range covered by the base station, and the second position is a ground position farthest from the base station within the ground range covered by the base station.

Optionally, the first duration being determined by the base station based on the transmission delay includes the followings. When a value of a candidate duration among all candidate durations of the random access contention resolution timer is greater than the transmission delay, the first duration is a candidate duration which is greater than the transmission delay and has a minimum difference from the transmission delay. When none of all candidate durations of the random access contention resolution timer has a value greater than the transmission delay, the first duration is a maximum candidate duration.

In the embodiment, the first duration ra-ContentionResolutionTimer_long may be determined based on a difference between the signal RTT_between the position closest to the satellite in the ground range covered by the satellite and the satellite and the signal RTT_between the position farthest from the satellite in the ground range covered by the satellite and the satellite, as well as the time required by the network to process the Msg3 and schedule the Msg4 take into account. For the specific implementation, reference may be made to the manner of determining the duration of the random access contention resolution timer in Scenario 1, and details thereof will be omitted here.

Optionally, the second duration is determined by the base station based on time for processing the Message 3 (Msg3) in the random access and scheduling the Message 4 (Msg4) in the random access.

In the embodiment, the second duration ra-ContentionResolutionTimer_short may be determined based on the time required by the network to process the Msg3 and schedule the Msg4. A method for determining the duration of the random access contention resolution timer in Scenario 2 may be used, and details thereof will be omitted here.

In one embodiment, the initial time offset of the random access contention resolution timer is determined by the base station based on a signal RTT between a first position and the base station, and the first position is a ground position closest to the base station within a ground range covered by the base station. Further, the initial time offset of the random access contention resolution timer being determined by the base station based on the signal RTT between the first position and the base station includes the followings. When a candidate initial time offset among all candidate initial time offsets is smaller than the RTT, the initial time offset of the random access contention resolution timer is a candidate initial time offset which is smaller than the RTT and has a minimum difference from the RTT. When all the candidate initial time offsets are greater than the RTT, the initial time offset of the random access contention resolution timer is a minimum candidate initial time offset.

In the present embodiment, the network may determine the initial time offset TimeOffset of the ra-ContentionResolutionTimer based on the signal transmission RTT between the position closest to the satellite in the ground range covered by the satellite and the satellite, that is, the same method as that in scenario 1 is adopted, and details thereof will be omitted here.

Here, it should be noted that, the initial offset time of the ra-ContentionResolutionTimer and the configuration of the duration of the ra-ContentionResolutionTimer (including ra-ContentionResolutionTimer_long and ra-ContentionResolutionTimer_short) depend on the network implementation. The above only provides one implementation method of the network, but the network may determine the configuration of these parameters based on other methods and is not limited thereto.

In this Scenario 3, each of the UEs determines the initial offset time of the ra-ContentionResolutionTimer and the duration of the ra-ContentionResolutionTimer based on whether the UE has positioning capability.

(1) When the UE is a terminal with positioning capability, the initial offset time of the random access contention resolution timer is determined by the UE based on a signal RTT between a position of the UE and the base station. The second duration is the longest time for listening to the PDCCH.

In the embodiment, for a UE with positioning capability, the initial offset time of ra-ContentionResolutionTimer is determined by the UE estimating the signal RTT_between the UE and the communicated satellite, and the duration of ra-ContentionResolutionTimer is the second duration ra-ContentionResolutionTimer_short configured by the network.

(2) When the UE is a terminal without positioning capability, the initial offset time of the random access contention resolution timer is determined by the UE based on the initial time offset of the random access contention resolution timer carried in the network configuration information. The first duration is the longest time for listening to the PDCCH.

In the embodiment, for a UE without positioning capability, the initial offset time of ra-ContentionResolutionTimer is determined by the UE based on TimeOffset in the network configuration information, and the duration of ra-ContentionResolutionTimer is the first duration ra-ContentionResolutionTimer_long configured by the network.

Figure 6:
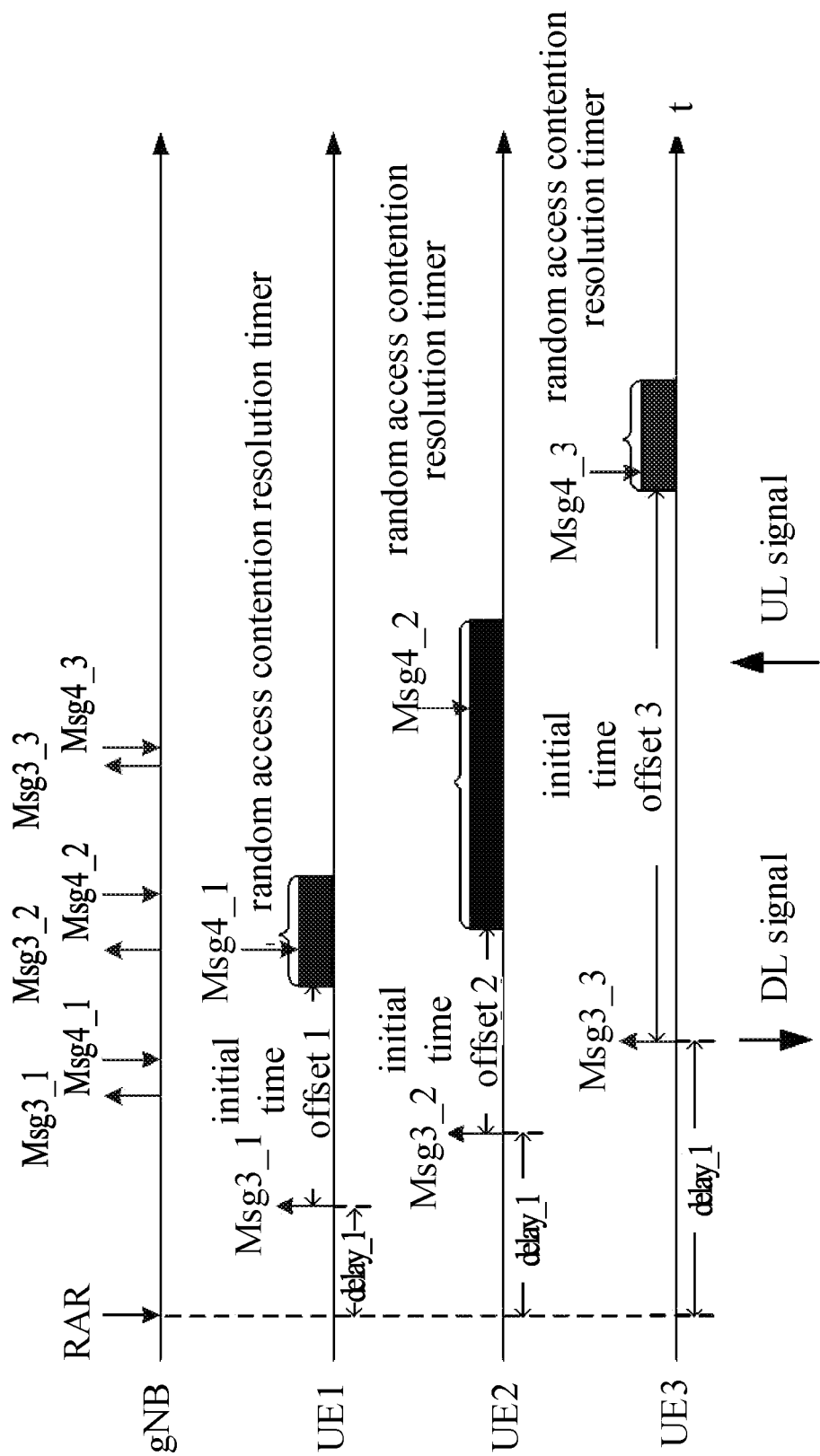
FIG. 6 is a schematic timing diagram showing a channel listening method according to yet another embodiment.

FIG. 6 is a schematic timing diagram showing a channel listening method according to another embodiment. As shown in FIG. 6, a UE receives network configuration information broadcasted by a satellite, and obtains a configuration of the random access contention resolution timer. The configuration includes one initial time offset TimeOffse_config of a timer and two timer durations i.e., ra-ContentionResolutionTimer_short and ra-ContentionResolutionTimer_long. For three UEs (UE 1, UE 2, and UE 3) within a cell, each UE determines initial offset time of its ra-ContentionResolutionTimer and a duration of the ra-ContentionResolutionTimer based on whether it has positioning capability.

For UE 1 which has positioning capability, the initial offset time of ra-ContentionResolutionTimer of the UE1 is determined by the UE1 based on an estimated signal transmission delay between the UE1 and the satellite, i.e., TimeOffset_1=2*delay_1, and the timer duration is ra-ContentionResolutionTimer_1=ra-ContentionResolutionTimer_short.

For the UE 2 which has no positioning capability, the initial time offset of ra-ContentionResolutionTimer of the UE 2 has the value configured by the network, i.e., TimeOffset_2=TimeOffset config, the timer duration is ra-ContentionResolutionTimer_2=ra-ContentionResolutionTime_long.

For UE 3 which has positioning capability, the initial offset time of ra-ContentionResolutionTimer of the UE 3 is determined by the UE3 based on an estimated signal transmission delay between the UE 3 and the satellite, i.e., TimeOffset_3=2×delay_3, and the timer duration is ra-ContentionResolutionTimer_3=ra-ContentionResolutionTimer_short.

For each UE, in the random access procedure, the UE starts ra-ContentionResolutionTimer at the first time symbol after a period of TimeOffset elapsed since the UE transmitted Msg3 each time, and the longest time for listening to the random access contention resolution message by the UE is the duration of the ra-ContentionResolutionTimer. The TimeOffset and ra-ContentionResolutionTimer uses the values determined in the above steps.

In the channel listening method according to the embodiment, for a scenario in which the UE with positioning capability and the UE without positioning capability coexist within the coverage area of the satellite, the satellite configures one initial time offset of a random access contention resolution timer and two durations of random access contention resolution timers in a broadcasting mode. For the UE with positioning capability and the UE without positioning capability, different methods are adopted to determine the starting time of the respective random access contention resolution timers and the longest time for listening to a PDCCH. The configuration manner is flexible, and can ensure that both the UE with positioning capability and the UE without positioning capability can obtain accurate initial offset time and duration of the random access contention resolution timer, thereby guaranteeing the listening quality and reducing the terminal loss.

It should be understood that, although the various steps in the flowcharts of FIG. 2 and FIG. 3 are shown in order as indicated by arrows, the steps are not necessarily performed in order as indicated by the arrows. Unless explicitly stated herein, the steps are not limited to being performed in the exact order illustrated and, may be performed in other orders. In addition, at least some of the steps in FIG. 2 and FIG. 3 may include multiple sub-steps or multiple stages that are not necessarily performed at the same time, but may be performed at different time. The sub-steps or stages are not necessarily performed in a sequential order, but may be performed alternately or alternately with other steps or at least some of sub-steps or stages of other steps.

Figure 7:
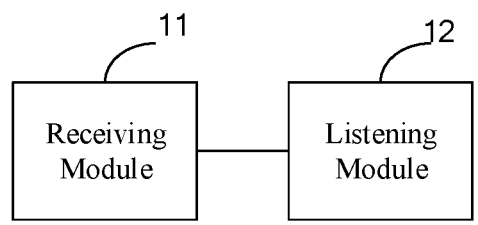
FIG. 7 is a block diagram of a channel listening apparatus according to an embodiment of the present disclosure.

In one embodiment, as shown in FIG. 7, a channel listening apparatus is provided. The channel listening apparatus includes a receiving module 11 and a listening module 12.

The receiving module 11 is configured to receive network configuration information transmitted by a base station, the network configuration information including at least a duration of a random access contention resolution timer.

The listening module 12 is configured to determine initial offset time of the random access contention resolution timer, and start to listen to a Physical Downlink Control Channel (PDCCH) at a first time symbol after the initial offset time is reached, the duration of the random access contention resolution timer being a longest time for listening to the PDCCH.

Figure 8:
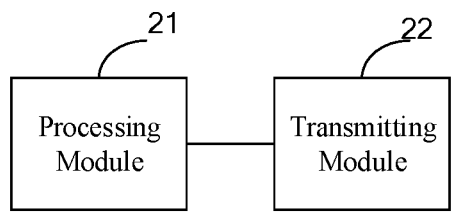
FIG. 8 is a block diagram of a channel listening apparatus according to another embodiment of the present disclosure.

In one embodiment, as shown in FIG. 8, a channel listening apparatus is provided. The channel listening apparatus includes a processing module 21 and a transmitting module 22.

The processing module 21 is configured to transmit network configuration information to a User Equipment (UE) through the transmitting module 22, the network configuration information includes at least a duration of a random access contention resolution timer. The UE is configured to determine initial offset time of the random access contention resolution timer, and start to listen to a Physical Downlink Control Channel (PDCCH) at a first time symbol after the initial offset time is reached, the duration of the random access contention resolution timer is a longest time for listening to the PDCCH.

In one embodiment, the network configuration information further includes an initial time offset of the random access contention resolution timer, and the initial offset time is determined by the UE based on the initial time offset of the random access contention resolution timer.

In one embodiment, the duration of the random access contention resolution timer is determined by the base station based on a transmission delay, the transmission delay is determined by the base station based on a difference between a signal Round Trip time (RTT) between a first position and the base station and a signal RTT_between a second position and the base station, time for processing Message 3 (Msg3) in random access, and time for scheduling Message 4 (Msg4) in the random access. The first position is a ground position closest to the base station within a ground range covered by the base station, and the second position is a ground position farthest from the base station within the ground range covered by the base station.

In one embodiment, the duration of the random access contention resolution timer being determined by the base station based on the transmission delay includes:
when a value of a candidate duration among all candidate durations of the random access contention resolution timer is greater than the transmission delay, the duration of the random access contention resolution timer being a candidate duration which is greater than the transmission delay and has a minimum difference from the transmission delay; and
when none of all candidate durations of the random access contention resolution timer has a value greater than the transmission delay, the duration of the random access contention resolution timer being a maximum candidate duration.

In one embodiment, the initial offset time is determined by the UE based on a signal Round Trip time (RTT) between a position of the UE and the base station.

In one embodiment, the duration of the random access contention resolution timer is determined by the base station based on time for processing Message 3 (Msg3) in random access and time for scheduling Message 4 (Msg4) in the random access.

In one embodiment, the network configuration information includes a first duration and a second duration of the random access contention resolution timer, the first duration is greater than the second duration, and the network configuration information further includes an initial time offset of the random access contention resolution timer.

In one embodiment, the first duration is determined by the base station based on a transmission delay, the transmission delay is determined by the base station based on a difference between a signal Round Trip Time (RTT) between a first position and the base station and a signal RTT_between a second position and the base station, time for processing Message 3 (Msg3) in random access, and time for scheduling Message 4 (Msg4) in the random access. The first position is a ground position closest to the base station within a ground range covered by the base station, and the second position is a ground position farthest from the base station within the ground range covered by the base station.

In one embodiment, the first duration being determined by the base station based on the transmission delay includes:
when a value of a candidate duration among all candidate durations of the random access contention resolution timer is greater than the transmission delay, the first duration being a candidate duration which is greater than the transmission delay and has a minimum difference from the transmission delay; and
when none of all candidate durations of the random access contention resolution timer has a value greater than the transmission delay, the first duration being a maximum candidate duration.

In one embodiment, the second duration is determined by the base station based on time for processing Message 3 (Msg3) in random access and time for scheduling Message 4 (Msg4) in the random access.

In one embodiment, the initial time offset of the random access contention resolution timer is determined by the base station based on a signal Round Trip time (RTT) between a first position and the base station, and the first position is a ground position closest to the base station within a ground range covered by the base station.

In one embodiment, the initial time offset of the random access contention resolution timer being determined by the base station based on the signal RTT between the first position and the base station includes:
when a candidate initial time offset among all candidate initial time offsets is smaller than the RTT, the initial time offset of the random access contention resolution timer being a candidate initial time offset which is smaller than the RTT and has a minimum difference from the RTT; and
when all the candidate initial time offsets are greater than the RTT, the initial time offset of the random access contention resolution timer being a minimum candidate initial time offset.

In one embodiment, the UE is a terminal with positioning capability, and the initial offset time of the random access contention resolution timer is determined by the UE based on a signal RTT between a position of the UE and the base station. The second duration is the longest time for listening to the PDCCH.

In one embodiment, the UE is a terminal without positioning capability, and the initial offset time of the random access contention resolution timer is determined by the UE based on the initial time offset of the random access contention resolution timer carried in the network configuration information. The first duration is the longest time for listening to the PDCCH.

In one embodiment, the network configuration information is carried in a system message.

The implementation principle and technical effect of the channel listening apparatus provided in the foregoing embodiments are similar to those of the foregoing method embodiments, the details thereof will be omitted here.

For the specific definition of the channel listening apparatus, reference may be made to the definition of the channel listening method in the foregoing, the details thereof will be omitted here. The various modules in the channel listening apparatus described above may be implemented in whole or in part by software, hardware, and combinations thereof. The modules can be embedded in a hardware form in a processor in the computer device or independent of a processor in the computer device in a hardware form, and can also be stored in a memory in the computer device in a software form, so that the processor can invoke and execute operations corresponding to the modules.

Figure 9:
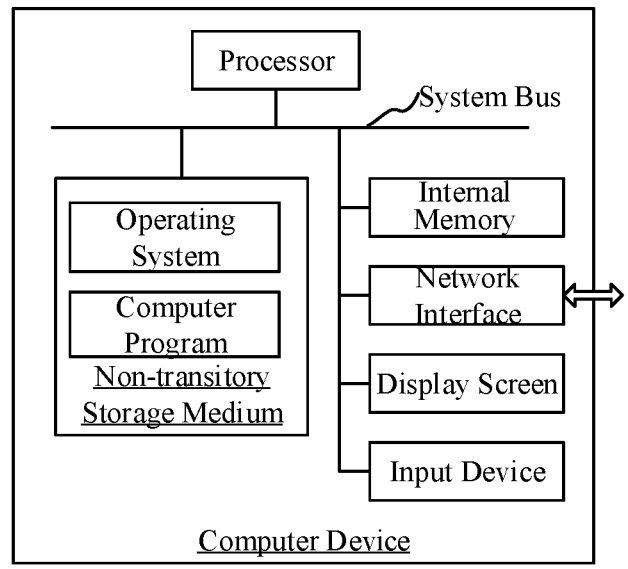
FIG. 9 is a block diagram of a computer device according to an embodiment of the present disclosure.

In one embodiment, there is provided a computer device which may be a terminal. FIG. 9 shows an internal structure diagram of the computer device. The computer device includes a processor, a memory, a network interface, a display screen and an input device which are connected through a system bus. The processor of the computer device is configured to provide computing and control capabilities. The memory of the computer device includes a non-transitory storage medium and an internal memory. The non-transitory storage medium stores an operating system and a computer program. The internal memory provides an environment in which the operating system and the computer program in the non-transitory storage medium can run. The network interface of the computer device is configured to communicate with an external terminal through a network connection. The computer program when executed by the processor can implement a channel listening method. The display screen of the computer device can be a liquid crystal display screen or an electronic ink display screen, and the input device of the computer device can be a touch layer covered on the display screen, a key, a track ball or a touch pad arranged on a shell of the computer device, an external keyboard, touch pad or mouse and the like.

Figure 10:
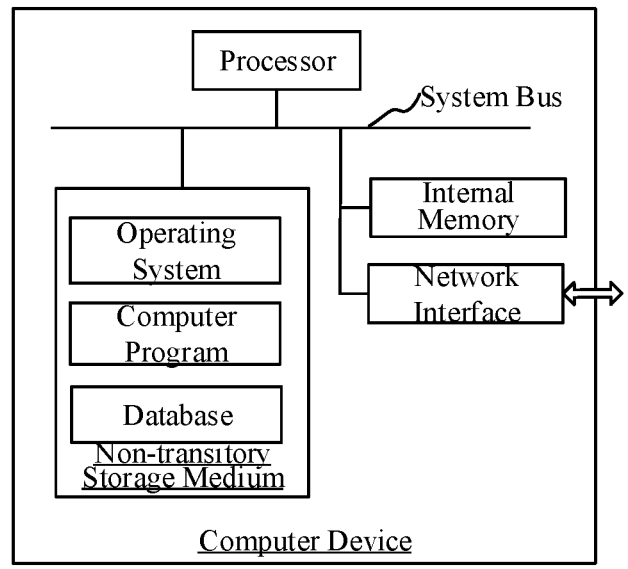
FIG. 10 is a block diagram of a computer device according to another embodiment of the present disclosure.

In one embodiment, there is provided a computer device which may be a base station. FIG. 10 shows an internal structure diagram of the computer device. The computer device includes a processor, a memory, a network interface, and a database connected by a system bus. The processor of the computer device is configured to provide computing and control capabilities. The memory of the computer device includes a non-transitory storage medium and an internal memory. The non-transitory storage medium stores an operating system, a computer program, and a database. The internal memory provides an environment in which the operating system and the computer program in the non-transitory storage medium can run. The database of the computer device is configured to store channel listening data. The network interface of the computer device is configured to communicate with an external terminal through a network connection. The computer program when executed by the processor can implement a channel listening method.

It will be appreciated by those skilled in the art that the configurations shown in FIG. 9 or FIG. 10 are only block diagrams of portions of configurations relevant to the present disclosure, and do not constitute a limitation to the computer device to which the solution of the present disclosure is applied. A particular computer device may include more or less components than those shown in the figures, or may combine certain components, or have a different arrangement of components.

In one embodiment, a terminal is provided. The terminal includes a processor and a memory storing a computer program. The computer program, when executed by the processor, implements the following steps:
  receiving network configuration information transmitted by a base station, the network configuration information including at least a duration of a random access contention resolution timer; and
  determining initial offset time of the random access contention resolution timer is, and starting to listen to a Physical Downlink Control Channel (PDCCH) at a first time symbol after the initial offset time is reached, the duration of the random access contention resolution timer being a longest time for listening to the PDCCH.

In one embodiment, there is provided a base station including a processor and a memory storing a computer program. The computer program, when executed by the processor, implements the following steps:
  transmitting network configuration information to a UE, the network configuration information including at least a duration of a random access contention resolution timer; and
  determining, by the UE, initial offset time of the random access contention resolution timer, and starting to listen to a Physical Downlink Control Channel (PDCCH) at a first time symbol after the initial offset time is reached, the duration of the random access contention resolution timer being a longest time for listening to the PDCCH.

The implementation principles and technical effects of the terminal and the base station provided by the above embodiments are similar to those of the above method embodiments, and details thereof will be omitted here.

In one embodiment, there is provided a computer-readable storage medium having a computer program stored therein. The computer program, when executed by a processor, implements the following steps:
  receiving network configuration information transmitted by a base station, the network configuration information including at least a duration of a random access contention resolution timer; and
  determining initial offset time of the random access contention resolution timer, and starting to listen to a Physical Downlink Control Channel (PDCCH) at a first time symbol after the initial offset time is reached, the duration of the random access contention resolution timer being a longest time for listening to the PDCCH.

In one embodiment, there is provided a computer-readable storage medium having a computer program stored therein. The computer program, when executed by a processor, implements the following steps:
  transmitting network configuration information to a UE, the network configuration information including at least a duration of a random access contention resolution timer; and
  determining, by the UE, initial offset time of the random access contention resolution timer, and starting to listen to a Physical Downlink Control Channel (PDCCH) at a first time symbol after the initial offset time is reached, the duration of the random access contention resolution timer being a longest time for listening to the PDCCH.

The implementation principles and technical effects of the computer-readable storage medium provided in the above embodiments are similar to those of the above method embodiments, and will be omitted here.

It will be understood by those skilled in the art that, a computer program may instruct related hardware to implement all or a part of the processes of the methods in the embodiments described above. The computer program may be stored in a non-transitory computer-readable storage medium. The computer program when executed, may perform the processes of the methods in the embodiments described above. Any reference to memory, storage, database or other medium used in the embodiments provided in the present disclosure can include non-transitory and/or transitory memory. The non-transitory memory can include a read-only memory (ROM), a Programmable ROM (PROM), an Electrically Programmable ROM (EPROM), an Electrically Erasable Programmable ROM (EEPROM), or a flash memory. The transitory memory can include a Random Access Memory (RAM) or an external cache memory. By way of illustration and not limitation, RAM is available in a variety of forms such as a Static RAM (SRAM), a Dynamic RAM (DRAM), a Synchronous DRAM (SDRAM), a Double Data Rate SDRAM (DDRSDRAM), an Enhanced SDRAM (ESDRAM), a synchronous Link (Synchlink) DRAM (SLDRAM), a memory bus (such as Rambus) Direct RAM (such as RDRAM), a Direct memory bus (such as Rambus) dynamic RAM (such as DRDRAM), a memory bus (such as Rambus) dynamic RAM (RDRAM), etc.

Any combination of various technical features in the foregoing embodiments is possible. In order to make the description brief, not all possible combinations of various technical features in the foregoing embodiments are described. However, as long as there is no conflict between the technical features in any combination, the combination should be considered to be within the scope of this disclosure. The above embodiments illustrate merely some implementations of the present disclosure. Although the above embodiments are described in detail, they cannot be construed as limiting the scope of the present disclosure. It should be pointed that, for those of ordinary skill in the art, without departing from the concept of the present disclosure, some changes and improvements may be made. These changes and improvements are encompassed by the protection scope of the present disclosure. Therefore, the protection scope of the present disclosure should be based on the appended claims.

What is claimed is:

1. A channel listening method, comprising:
   receiving, by a User Equipment (UE), network configuration information transmitted by a base station, the network configuration information comprising at least a duration of a random access contention resolution timer; and
   determining, by the UE, initial offset time of the random access contention resolution timer, and starting to listen to a Physical Downlink Control Channel (PDCCH) when starting the random access contention resolution timer in a first symbol after expiration of a signal Round Trip Time (RTT), wherein the random access contention resolution timer is started in the first symbol after the RTT expires, wherein the RTT is between a position of the UE and the base station, and the RTT starts to be timed at ending transmission of Message 3 (Msg3) in random access, the duration of the random access contention resolution timer being a longest time for listening to the PDCCH; wherein
   the network configuration information comprises a first duration and a second duration of the random access contention resolution timer, the first duration being greater than the second duration, and the network configuration information further comprises an initial time offset of the random access contention resolution timer; and
   the first duration is determined by the base station based on a transmission delay, the transmission delay being determined by the base station based on a difference between a signal RTT between a first position and the base station and a signal RTT between a second position and the base station, time for processing the Msg3 in the random access, and time for scheduling Message 4 (Msg4) in the random access; the first position is a ground position closest to the base station within a ground range covered by the base station, and the second position is a ground position farthest from the base station within the ground range covered by the base station.

2. The method according to claim 1, wherein the initial offset time is determined by the UE based on the initial time offset of the random access contention resolution timer.

3. The method according to claim 1, wherein the initial offset time is determined by the UE based on the signal RTT between the position of the UE and the base station.

4. The method according to claim 1, wherein the UE is a terminal with positioning capability, and the initial offset time of the random access contention resolution timer is determined by the UE based on the signal RTT between the position of the UE and the base station; and
   the second duration is the longest time for listening to the PDCCH.

5. The method according to claim 1, wherein the UE is a terminal without positioning capability, and the initial offset time of the random access contention resolution timer is determined by the UE based on the initial time offset of the random access contention resolution timer carried in the network configuration information; and
   the first duration is the longest time for listening to the PDCCH.

6. The method according to claim 1, wherein the network configuration information is carried in a system message.

7. A terminal, comprising a processor and a memory storing a computer program, wherein the computer program, when executed by the processor, implements steps of the method according to claim 1.

8. A non-transitory computer-readable storage medium, having a computer program stored therein, wherein the computer program, when executed by a processor, implements steps of the method according to claim 1.

9. A channel listening method, comprising:
   transmitting, by a base station, network configuration information to a UE, the network configuration information comprising at least a duration of a random access contention resolution timer,
   wherein the UE is configured to determine initial offset time of the random access contention resolution timer, and start to listen to a Physical Downlink Control Channel (PDCCH) when starting the random access contention resolution timer in a first symbol after expiration of a signal Round Trip Time (RTT), wherein the random access contention resolution timer is started in the first symbol after the RTT expires, wherein the RTT is between a position of the UE and the base station, and the RTT starts to be timed at ending transmission of Message 3 (Msg3) in random access, the duration of the random access contention resolution timer being a longest time for listening to the PDCCH; wherein
   the network configuration information comprises a first duration and a second duration of the random access contention resolution timer, the first duration being greater than the second duration, and the network configuration information further comprises an initial time offset of the random access contention resolution timer; and
   the first duration is determined by the base station based on a transmission delay, the transmission delay being determined by the base station based on a difference between a signal RTT between a first position and the base station and a signal RTT between a second position and the base station, time for processing the Msg3 in the random access, and time for scheduling Message 4 (Msg4) in the random access; the first position is a ground position closest to the base station within a ground range covered by the base station, and the second position is a ground position farthest from the base station within the ground range covered by the base station.

10. The method according to claim 9, wherein the initial offset time is determined by the UE based on the initial time offset of the random access contention resolution timer.

11. The method according to claim 9, wherein the initial offset time is determined by the UE based on the signal RTT between the position of the UE and the base station.

12. The method according to claim 9, wherein the UE is a terminal with positioning capability, and the initial offset time of the random access contention resolution timer is determined by the UE based on the signal RTT between the position of the UE and the base station; and the second duration is the longest time for listening to the PDCCH.

13. The method according to claim 9, wherein the UE is a terminal without positioning capability, and the initial offset time of the random access contention resolution timer is determined by the UE based on the initial time offset of the random access contention resolution timer carried in the network configuration information; and the first duration is the longest time for listening to the PDCCH.

14. The method according to claim 9, wherein the network configuration information is carried in a system message.

15. A channel listening apparatus, comprising a processor and a memory, wherein the memory is configured to store a computer program, and the processor is configured to invoke and execute the computer program stored in the memory to implements steps of the method according to claim 9.

16. A base station, comprising a processor and a memory storing a computer program, wherein the computer program, when executed by the processor, implements steps of the method according to claim 9.

17. A non-transitory computer-readable storage medium, having a computer program stored therein, wherein the computer program, when executed by a processor, implements steps of the method according to claim 9.

18. A channel listening apparatus, comprising a processor and a memory, wherein the memory is configured to store a computer program, and the processor is configured to invoke and execute the computer program stored in the memory to:

receive network configuration information transmitted by a base station, wherein the network configuration information comprises at least a duration of a random access contention resolution timer; and determine initial offset time of the random access contention resolution timer, and start to listen to a Physical Downlink Control Channel (PDCCH) when starting the random access contention resolution timer in a first symbol after expiration of a signal Round Trip Time (RTT), wherein the random access contention resolution timer is started in the first symbol after the RTT expires, wherein the RTT is between a position of the UE and the base station, and the RTT starts to be timed at ending transmission of Message 3 (Msg3) in random access, wherein the duration of the random access contention resolution timer is a longest time for listening to the PDCCH; wherein the network configuration information comprises a first duration and a second duration of the random access contention resolution timer, the first duration being greater than the second duration, and the network configuration information further comprises an initial time offset of the random access contention resolution timer; and the first duration is determined by the base station based on a transmission delay, the transmission delay being determined by the base station based on a difference between a signal RTT between a first position and the base station and a signal RTT between a second position and the base station, time for processing the Msg3 in the random access, and time for scheduling Message 4 (Msg4) in the random access; the first position is a ground position closest to the base station within a ground range covered by the base station, and the second position is a ground position farthest from the base station within the ground range covered by the base station.

\* \* \* \* \*